June 3, 1930.  J. GOOD  1,761,388
ENGINE HEATING DEVICE
Original Filed May 21, 1923   2 Sheets-Sheet 1
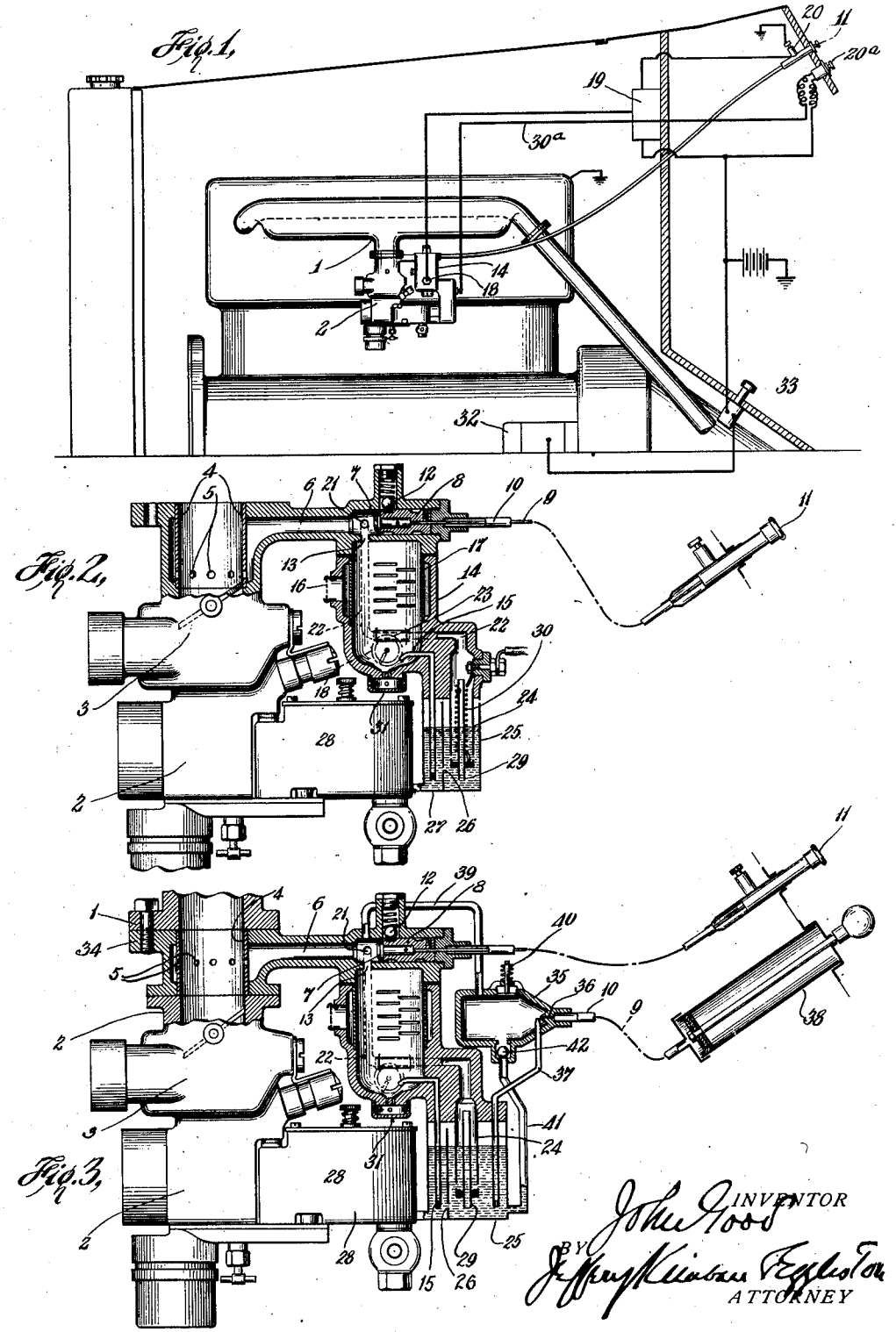

June 3, 1930.  J. GOOD  1,761,388
ENGINE HEATING DEVICE
Original Filed May 21, 1923   2 Sheets-Sheet 2
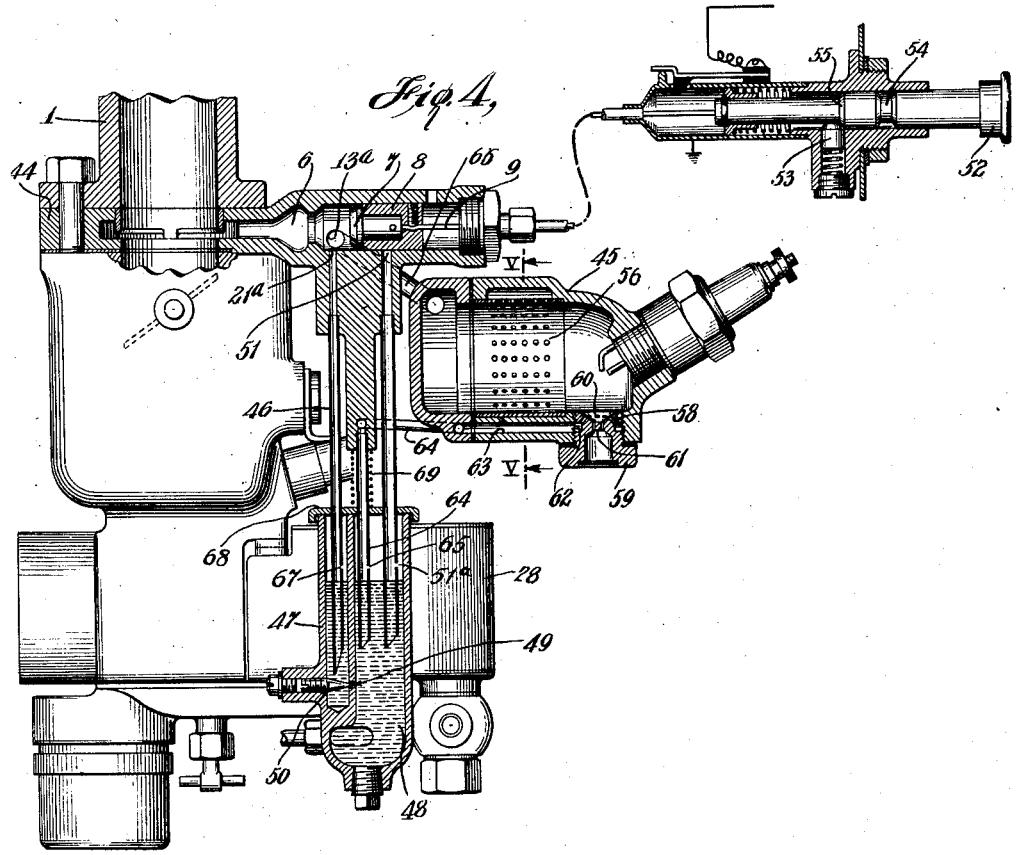
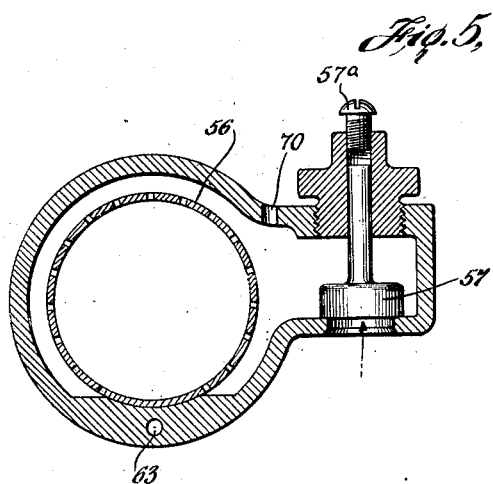
INVENTOR
ATTORNEY Patented June 3, 1930

1,761,388

UNITED STATES PATENT OFFICE

JOHN GOOD, OF GARDEN CITY, NEW YORK, ASSIGNOR TO GOOD INVENTIONS CO., OF NEW YORK, N. Y., A CORPORATION OF NEW YORK

ENGINE HEATING DEVICE

Application filed May 21, 1923, Serial No. 640,620. Renewed September 1, 1928.

The invention relates to the application of heating devices to internal combustion engines for the purpose of providing a hot vaporized mixture of fuel and air for starting the engine in operation when cold, or on low grade fuels, or for use in operating the engine after starting, as during its warming up period, or for both these purposes, and the invention particularly relates to such apparatus as applied to automotive engines, and to this and other ends consists in the various parts and combinations of parts and in the relative arrangement and co-operation thereof as hereinafter disclosed. More especially this invention consists in a preferred embodiment of the principles disclosed and claimed in my prior Patent No. 1,377,989, filed Nov. 6, 1919, and in a divisional application thereof, S. N. 465,068, filed April 27, 1921.

In the accompanying drawings, several forms of the present invention are shown in an opened out arrangement for convenience of illustration, but it will be understood that in practice the parts are organized in compact form to be applied either as an attachment to existing engines or to be built into the regular carburetor or intake header thereof.

Fig. 1 represents a side elevation of a conventional automobile engine with one form of the invention applied to it;

Fig. 2 an enlarged view of the liquid fuel burner and auxiliary fuel supply mechanism of that figure in vertical section;

Fig. 3 represents substantially the same arrangement as Figure 2 with the addition of a different kind of priming device for the engine;

Fig. 4 represents another form of the burner and auxiliary fuel supply, and

Fig. 5 a cross-section of the burner of Figure 4 showing its air inlet.

The conventional engine shown in Fig. 1 comprises the usual or any suitable intake 1, including a carburetor 2 which is of conventional form, except that it is provided with an entrance for the hot vaporized mixture immediately above the throttle 3. This entrance is formed by a thimble 4 fitted into the flanged end of the carbureter and provided with a ring of holes 5 through which the hot medium or mixture enters the intake and passes to the engine. The carbureter may be understood to consist as usual of one or more fuel jets and air entrances adapted to produce a normal engine-operating mixture of fuel and air and to be provided with all such necessary appurtenances and adjustments as may be requisite to this purpose. Its mixture may be heated by contact with the thimble or with the hot medium itself. Although certain features and principles of this invention are useful in combination with combustion engines, regardless of the design of the heat source or its mode of operation, the invention is herein illustrated in connection with a liquid fuel burner operated by suction produced in the engine and consists in various special combinations of that type. The corresponding principles as applied to the pressure type of burners forms the subject of a companion application.

The outlet of the suction burner, as herein shown, is connected to the intake entrance device 4 by a passage 6, which includes a valve chamber provided with a valve 7, whereby the connection may be opened and closed at the will of the operator. This valve is of the poppet type with its stem loosely mounted in a sliding block 8 connected by a wire 9 in a tube 10 to a button 11 mounted on the instrument board at the operator's station. By pushing this button, the valve body is moved to carry the valve 7 against its seat, the closing movement being preferably toward the intake, i. e. in the direction of flow from the burner, and the opening movement carrying the valve to a position where it is not in the direct path of flow. This type of valve is particularly suited for controlling the flow of flame or hot combustion products and is the least likely to become impaired by the effect of heat. The block or some part, moving with it, other than the valve proper, is provided with a detent 12 to retain it in its forward closed position so that it is not likely to be opened as the result of a possible backfire in the engine intake passage, and also to hold it in its open position against accidental closure. The valve chamber may be formed in the carbureter or directly in the upper part of the burner structure, and preferably in the latter. The hot burner products enter it from the burner outlet 13, in the side wall of the valve chamber.

The burner comprises a body or casing 14, provided with fuel and air entrances, an igniter, and also in its preferred form, with a number of ducts or passages formed by drilling through it as will later appear. The suction effect transmitted to the interior mixing and flame space of the burner, when the valve 7 is open, draws in liquid fuel from the fuel tube 15, which liquid falls or flows from the tube orifice into a shallow well at the bottom of the casing. The floor of this well is provided with a number of very fine air entrances so that the air from atmosphere inflowing therethrough sprays the fuel upwardly in the casing. Air to support the combustion of this spray is drawn into the burner through the entrance 16 and through the zone of slits formed in the interior air-distributing shell 17 surrounding the spray. The spark plug or other suitable igniter, 18, is preferably situated between the spray source and the zone of slits. The spark plug may be connected to one of the engine spark plugs if desired so that it will become energized wherever a suction effect is created by the engine or it may be connected to a special spark coil such as indicated at 19 in Fig. 1 to be controlled by a switch 20 associated with the button 11 on the instrument board, or in any other appropriate manner. Whenever an adequate suction is transmitted to the burner, the igniter being energized, ignition occurs and the flame and combustion products are sucked through the valve-controlled passages 13 and 6, through the thimble 4, into the intake passage and thence to the engine.

The design of burner illustrated, and also preferred, is one in which the parts are so proportioned that considerably more air is drawn in through the combustion air entrance 16 and shell 17 than is required for the complete combustion of the fuel. This affords certain advantages in respect to ignition and the subsequent combustion and this type of burner is herein termed an excess air burner. There is, with this type of burner, a considerable portion of air or uncombined oxygen in the burner products which pass to the engine along with the mixture from the main carbureter 3, and its tendency is to dilute such mixture making it too lean for satisfactory combustion effects unless means are taken to avoid this consequence. While it is possible to increase the richness of the mixture from the main carbureter sufficiently to balance the excess air from the burner, this method would not be satisfactory unless the burner were to be continuously used, which is not always desirable. The preferred method of compensating for the excess air in the burner products is to introduce auxiliary fuel in a small amount sufficient to burn therewith (in the engine), mixing the same with the burner products prior to their entry to the engine, and preferably prior to their arrival at the valve chamber. With this arrangement, such auxiliary fuel is transformed into vapor by contact with the burner products, but without ignition thereby and the valve 7 may be used to admit or exclude the resulting mixture without any effect on the mixture proportions delivered to the engine, and more especially without depriving the engine of the ability to idle at a desirably slow speed when the valve is shut. It may be explained in this connection, that the presence of the expanding hot medium in the engine intake passage, above the carbureter has a tendency to satisfy the suction therein so that the action of the carbureter is then reduced, and the amount of fuel mixture supplied is correspondingly reduced except as furnished by the hot medium. Without the auxiliary fuel therefore, the engine would idle either too slowly when the valve is open or too rapidly when closed.

The auxiliary fuel enters the valve chamber through a hole 21 which is connected by a tube or duct 22 shown in dotted lines in Fig. 2, a portion of which tube, marked 23, is exposed to the interior of the burner to be heated by the flame whenever the burner is in operation. The lower end of the duct 22 terminates in a closed tube or chamber 24 dipping into a fuel well 25 supplied with liquid fuel through a restricted aperture 26 from the receptacle 27 which supplies fuel to the burner tube 15. This receptacle is connected to the carbureter float bowl 28 and normally maintains the same liquid level. The suction effect transmitted to the chamber 24, through the duct 22, draws in liquid fuel through the fine tube 29 until the liquid level in the well 25 drops even with the air holes formed in the lower part of the tube 24 and thereafter draws in a portion of air along with the fuel, making a fairly rich mixture which passes through the duct 22 and the heated portion thereof 23, to the fuel outlet 21 and there combines with the products of the burner and passes with them to the suction intake, as above mentioned. While the liquid level in the well 25 is falling as above described, the duct 22 delivers an excessive amount of liquid fuel, but thereafter it delivers a substantially constant amount, or at a substantially constant rate. The initially large amount is found desirable when starting the apparatus in operation.

In case the burner does not become ignited, to heat and vaporize the auxiliary fuel, immediately on experiencing the suction effect, the auxiliary fuel supply device, may be associated with other means for vaporizing its fuel, thus surely to start the engine on its cycle. Failure of ignition may be due either to very poor quality fuel or to slow cranking by a weak starting battery, or extreme cold, or all these causes. On such occasions either the burner or the engine may be started by the application of electric heat or the engine may be primed by the use of means associated with the burner. Thus the electrical resistance wire 30, coiled about the fine tube 29 may be used to heat and vaporize the auxiliary fuel. This coil may be connected by wire 30ª to the same circuit which controls the primary of the spark coil 19 above referred to, or it may be operated by a separate switch such as shown at 20ª.

The cup 31 removably fixed to the bottom of the burner chamber is merely to protect the fine air holes in the bottom of the spraying well, as well as to collect and retain any possible drip of liquid fuel through the latter.

In the operation of the device above described, the operator pulls out the button 11, at the same time closing the switch 20ª, if necessary, and then, or coincidently closes the circuit of the starting motor 32 by means of the usual starter pedal 33. The suction produced by the revolving engine is transmitted simultaneously to the suction burner through the passage 13 and to the auxiliary fuel supply device through the connections 21 and 22, etc. Each of these devices is thereupon caused to deliver fuel. The fuel delivered by the auxiliary supply device is heated by the electric heating element when that is necessary to be used, and is converted into vapor, which on arrival in the engine cylinders mixed with air, is sufficient to start the combustion therein and thereby produce a corresponding increase in the suction effect. If ignition in the burner has not already occurred, this increased suction is sufficient to spray the fuel in the burner so finely as to make it certain of ignition, whereupon the heat from the flame thereafter takes the place of the electric heat and is also sufficient to perfect the mixture received by the engine so that the latter can be immediately used, even up to full load requirements, during the period until it becomes generally hot enough to take care of its own fuel vaporizing requirements.

The engine is preferably provided with an intake manifold, such as 1, associated with the exhaust passage, in such way as to maintain vaporization of the fuel after the control valve 7 is closed. It will be apparent that until said valve is closed the engine simultaneously receives fuel mixture from two sources, viz: from the main carbureter and also from the burner and auxiliary fuel source; this ordinarily results in a somewhat faster operation of the engine when idling than would be the case with the main carbureter alone, with its usual idling adjustment, and this is desirable partly because it serves as an indication to the operator that the valve is open, and the burner running, and partly because it enables the main carbureter to continue the idling at a reduced rate when the burner is shut off, as above explained.

While the auxiliary fuel supply and burner are herein shown as connected to the intake on the engine side of the carbureter and engine throttle, it will be understood that they may be connected to any point of the intake where an adequate suction effect may be obtained.

In Fig. 3, the construction of the burner proper and auxiliary fuel supply device is quite the same as that of Fig. 2, except that the passage 6 is connected to the engine intake by means of an adapter 34 interposed between the intake header 1 and the main carbureter 2. The construction and mode of operation of this adapter is plain in the drawing. This form of the invention employs a different method of providing an easily ignitible mixture for producing the initial explosion of the engine when the suction effect is inadequate for starting the burner. This method does not call for the consumption of electric energy from the storage battery of the vehicle. It consists of a chamber 35 in which means are provided to create a very fine, foglike spray of the liquid fuel as by the atomizing effect of a pressure air jet 36, co-acting with a fuel duct or tube 37, the lower end of which dips into the fuel in the well 25. The air jet 36 is supplied with air under considerable pressure by a small hand pump 38 mounted at the operator's station and the effect of its operation is to cause the vaporization in the chamber 35 of some of the lighter and more volatile constituents of the fuel. The suction effect of the rotating engine transmitted to the chamber 35 through a pipe or duct 39, draws this vapor and air into the engine and as it is highly inflammable it is effective in producing the initial explosions even with the heavier grades of motor fuel. The air supply to this priming device is through a small air check 40. The heavier constituents of the fuel which are not thus vaporized, are drained back to the fuel well 25 through the return pipe or duct 41 in which the ball valve 42 is placed to close upwardly against its seat under the effect of the suction and open to the position shown in the drawing to drain off the liquid residue, after the suction has stopped. The chamber 35 although shown in small size should, for best results, have considerable capacity, say about one quart. No heat is required. It will be noted that the closure of the valve 7 shuts off this priming device as well as the auxiliary fuel supply and the burner.

In Fig. 4, which represents the preferred form of the invention, also with its parts separated or spread out for the sake of clarity, the auxiliary fuel jet and suction burner operate on substantially the same principle as in the form already described. The passage 6 in this form is connected to the suction intake by an adapter 44 of very thin dimensions, and which admits the heated medium through an annular crevice instead of through a series of holes as in the former case. The control valve in this form has three positions as follows: First a closed position in which the intake passage is entirely shut off from the burner and its appurtenances: second, an intermediate position, in which the openings 13$^a$ and 21$^a$ are both connected to the intake passage: and, third, an engine priming position, later described. The opening 13$^a$ is the outlet for the flame or burner products of the burner 45, and the hole 21$^a$ is the outlet for the auxiliary fuel from fuel tube 46 and well 47, which parts constitute the auxiliary fuel supply device in this form. The well 47 is connected to the fuel cup 48 by a restricted opening 49 regulated by a needle valve 50, so that the fuel delivery is initially high and later substantially constant. It may be arranged to deliver fuel only such as will compensate excess air from the burner if the burner is of that type, but it preferably delivers fuel with a little air supplied by the hole 67. The fuel cup 48 is a part of the carburetor supply receptacle, or connected to it. In the third or extreme position the valve uncovers a priming port 51, through which the engine may freely suck in fuel directly from the fuel cup 48. Fuel so admitted, even in a raw state is useful for bringing about the first explosion when the engine is cold. In the present case such fuel is more or less mixed with air, entering by hole 51$^a$ and also with air and spray from the holes 13$^a$ and 21$^a$, before it reaches the intake passage.

For normal temperatures, it is sufficient only to pull the valve back to its intermediate position, and this extent of movement is prescribed and defined by the spring and detent arrangement associated with the valve button 52, which button is housed in a casing and under a spring pressure acting in the direction to close the valve 7. In its closed position the valve is subject to the retaining effect of a detent plunger 53 engaging a groove 54 in the shank of the button. In this position the detent spring holds the valve closed against opening in the case of backfire in the intake. In its intermediate position the detent engages with the shoulder 55 on the shank of the button to hold the valve against accidental displacement. There is no detent engagement for the third position, so that the button must therefore be held in that position by the operator, which arrangement guards against undue admission of raw fuel to the engine.

The burner proper in this form comprises an interior air distributing shell 56 to which atmospheric air is admitted partly by small hole 70 and the rest by a valve 57, the latter being shown as a gravity-seated check valve of simple design and provided with adjustable means such as the screw 57$^a$ to limit the opening movement. Fuel is sucked into the shell through a series of fine holes 58 formed in a removable plug 59, the inner or upper end of which is dished to form the spraying well 60. One or more holes in the bottom of this well establishes an upward air jet flow to spray the fuel against the spark plug where it is ignited. Fuel enters the well through the annular recess 62 in the fuel plug 59 registering with a duct 63 drilled in the casing of the burner and connected at its other end with the burner fuel tube 64, which latter dips into the fuel cup 48. Said fuel tube is desirably drilled with an air bleeding hole 65, as shown. The mixing and flame chamber of the burner is connected by a suitable duct 66 with the burner outlet 13$^a$ above referred to. It will be understood that in the actual device the valve chamber and burner are formed of a single body part and that the duct 66, as well as the other passages are formed by appropriately drilling through such part. The arrangement as shown is merely for convenience of illustration.

In Fig. 4, the auxiliary fuel duct 46 is not exposed to the heat of the burner as in the other forms; the heating and vaporization of the auxiliary fuel results in this case from the direct mingling therewith of the flame or hot products from the burner, which mixing occurs in passage 6 and without inflaming the fuel as will be understood by those familiar with this subject. The air supply hole 67 in the auxiliary fuel tube 46 is located just above the liquid level and this arrangement produces a fuel supply which, though small in amount, is delivered at a substantially constant rate when in normal operation. Air reaches the air hole through or under the cover 68 which is loosely seated on the fuel cup 48 and held against rattling by a spring 69. In all the forms above described the function of the auxiliary fuel supply is to moderate the temperature at the shut-off valve 7 which would otherwise be likely to burn out after a time from the effect of the flaming gases. It is important therefore where the shut-off valve is employed, that it be located in a position to receive the cooling effect of the auxiliary fuel.

As pointed out above, the application of heat to the carburetor mixture, as by pulling out the control button 11 or 52, coincides with an increase of rate of supply of combustible mixture to the engine and thus increases the minimum rate at which the engine can be run while the button remains pulled out; in other words, whenever the heat is on, the idling speed of the engine is higher. This effect is not essential but is of practical importance, not only because it serves as notice to the operator that heat is being applied but also because it tends to cause the engine to warm up more quickly. Obviously the type of heat transmitting means as well as the specific means for its control, is of no consequence to the effect explained. Moreover, in the form of Fig. 4 the same increase of minimum or idling speed coincides with the admission to the engine cylinders of an excessively rich mixture (produced by the uncovering of port 51) and which is desirable for starting the engine when it is very cold. And this is also a feature of the invention for the same reason, and because it is desirable that the engine operate with a faster idle while receiving the excessively rich starting mixture in order to be certain of adequate compression and firing.

From the example of the invention above described, it will now be apparent that its principles are capable of embodiment, individually and jointly, in different forms of apparatus and the subjoined claims are accordingly intended to cover broadly the various adaptations of such principles without limitation to the form of structure illustrated, and regardless of additions thereto, subtractions therefrom, or reversals thereof, as well, also, as the specific forms as illustrated.

I claim:

1. The combination in an internal combustion engine, of the intake passage including a carburetor and a throttle supply engine-operating mixture, auxiliary means for supplying hot mixture of fuel and air in proportions substantially the same as the proportions of said carburetor and means at the operator's station, independent of said throttle, for controlling the admission of said hot mixture to the carburetor mixture in said intake.

2. The combination with a combustion engine intake, of a carburetor and auxiliary means for conducting fuel to the intake adapted to conduct such fuel thereto initially at a high rate and later at less rate, a combustion device receiving liquid fuel independently of said auxiliary means and adapted to supply heat for vaporizing the fuel delivered thereby.

3. In an internal combustion engine, means for producing a hot mixture adapted for operating a cold engine under normal working load comprising a carburetor, an auxiliary liquid fuel supply, both communicating with the engine intake, a combustion device receiving liquid fuel independently of said auxiliary supply, an electric igniter in said device and means whereby said device transmits heat to said auxiliary fuel supply.

4. The combination in an automotive combustion engine, of the engine intake including a carburetor, an auxiliary fuel jet, a combustion device associated with the latter and having an outlet to the intake, and means at the operator's station for controlling the connection of said jet and said outlet to said intake.

5. The combination in an engine, of a carburetor, an auxiliary fuel supply, a liquid fuel burner, means for mixing flame or hot combustion products of said burner with said auxiliary fuel, means for conducting such mixture to the engine, and means for controlling the flow of such mixture independently of the carburetor.

6. The combination in an internal combustion engine, with the suction intake including a carburetor, of a suction burner, means for admitting a high temperature gaseous medium therefrom to said intake, a valve adapted to be advanced to intercept the flow of said medium and to be withdrawn out of the path thereof, and means for retaining said valve against displacement by back-fire in said intake.

7. The combination in an internal combustion engine, of a suction burner, a passage for admitting high temperature medium therefrom to the engine intake, and controlling means for said passage, comprising a poppet valve, a support in which said valve is loosely mounted, and means for advancing said support to close the valve upon its seat.

8. In an internal combustion engine, of a suction burner, a passage for transmitting flame or hot flame products therefrom to the engine intake comprising a valve chamber having a valve seat, and a valve block movable therein toward said seat, a poppet valve having its stem loosely mounted in said block and adapted to be carried thereby into engagement with the seat and means extending outside the valve chamber for moving the block and valve.

9. The combination in an internal combustion engine, of a suction burner, a passage for transmitting flame therefrom to the intake comprising a valve chamber, a valve seat therein, a valve therefor closing in the normal direction of flow, a sliding block by which said valve is loosely carried, means for manually operating said block and means for restraining movement of said valve and block by back pressure in the intake.

10. The combination in an engine, of a carburetor connected to the engine intake, an auxiliary fuel supply also connected thereto, a liquid fuel combustion device having a mixing and flame space, an electric igniter therein, and an outlet from said space leading to the engine intake.

11. The combination of the carbureter and the suction intake of an engine, an excess air burner delivering its products thereto and means for supplying fuel to said intake in proportion to produce a combustible mixture with the excess of air in said products.

12. The combination of the suction intake of an engine, an excess air burner adapted to deliver its products containing air thereto and means for supplying fuel to said intake, initially at a high rate and later at a less rate.

13. In an internal combustion engine, a main carbureting device, an excess air burner both delivering their products to the engine intake and an auxiliary fuel supply organized to deliver fuel to the intake in compensating ratio to the excess air in the burner products.

14. The combination of the suction intake of an engine, an excess air burner delivering its products thereto and operated by the suction therein, and means for supplying fuel at a rate to produce a combustible mixture with the excess of air in the burner products.

15. The combination in an internal combustion engine of a carburetor, a structure comprising a suction operated burner and an auxiliary fuel supply independent thereof, said structure being adapted for connection as an attachment to the engine intake and having a common outlet to said intake, and a manually controlled valve incorporated in said structure whereby flow through said outlet may be turned on and off.

16. In an internal combustion engine, the intake, a suction operated burner connected thereto, means for admitting liquid fuel to said burner, a well to receive such fuel and having an aperture constituting a suction air jet in the bottom of said well to spray the fuel therein and an igniter for the spray.

17. The combination of a suction intake, a suction-operated burner connected thereto, an inlet through which liquid fuel is sucked into the burner, the wall of the burner forming a space into which said fuel flows from the fuel inlet, a suction air jet coacting with said space to spray such fuel, an igniter for the spray, and means for admitting combustion supporting air to the burner.

18. In an internal combustion engine, the combination of the suction intake, a suction-operated excess air burner connected thereto and comprising suction inlets for combustion air and liquid fuel, the wall of said burner forming a space to which the sucked-in fuel flows, a suction air jet for said space to spray such fuel, in combination with means for admitting fuel to said intake in proportion to form an engine operating mixture with the excess air drawn into said burner.

19. In an internal combustion engine, the combination of the engine intake including a carburetor, a burner connected to the intake and operated by suction produced by the combustion operation of the engine and means independent of the action of the carburetor and burner for supplying an ignitible vaporous mixture to the engine for starting it in operation.

20. The combination with an engine intake, of a carburetor, a suction-operated excess air burner connected to said intake, means for admitting fuel to make a combustible mixture with the excess air in the burner products and means for supplying an easily ignitible fuel mixture to the engine for initiating its combustion operation.

21. The combination in an engine having a carburetor, of means of initiating the combustion operation of the engine comprising a chamber, means for finely atomizing liquid fuel to create a fuel fog in said chamber, an outlet from which the fog and vapor are drawn into the engine and another outlet through which the fuel in liquid form is removed from said chamber.

22. The combination in an engine intake including a carburetor and an auxiliary carburetor, a suction burner connected to the intake for operation by the suction produced by the combustion operation of the engine and associated in heating relation with said auxiliary carburetor, and additional means for supplying the engine with a priming charge of fuel to initiate the combustion operation thereof.

23. In an internal combustion engine, the combination of the intake and carburetor, a liquid fuel burner, an engine-priming device and means for optionally connecting either the burner alone, or the burner and said device, to said intake.

24. The combination in an internal combustion engine, of the intake passage including a carburetor to supply engine-operating mixture, an auxiliary device for supplying hot mixture, an engine-priming device and a single means controlling the connection of both said devices to the engine intake.

25. The combination in a combustion engine, of the intake and carburetor, and an auxiliary structure connected thereto, comprising an auxiliary fuel supply device, a combustion device and an engine-priming device, and means at the operator's station for controlling said devices.

26. The combination in a combustion engine, of the intake and carburetor, a device for supplying hot mixture to the intake, a device for supplying a priming fuel charge thereto, a member for successively connecting said devices to the intake and means acting to urge said member to a position disconnecting said priming device.

27. The combination in a carburetor engine, of a carburetor having a fuel receptacle, a suction burner having a fuel tube supplied from said receptacle, and an auxiliary fuel tube supplied from the same receptacle, both said tubes being provided with means near the liquid level for admitting air with the fuel.

28. The combination in an engine, of a carbureter having a throttle adapted to be set to produce a normal rate of idling, means including a suction burner for producing a hot vaporous combustible mixture, which, when added to the carbureter delivery, increases the rate of idling, and means for shutting off and turning on the supply of said mixture.

29. The combination in an engine, of a carbureter and a suction burner, a valved passage connecting the latter to the engine intake, and means for admitting liquid to said passage adapted to reduce the temperature at the valve therein.

30. The combination in an engine, of a carbureter and a suction burner both connected to the engine intake and means for introducing fuel in liquid form directly into contact with the combustion products of said burner.

31. The combination in an engine, of three independent means for making a mixture of liquid fuel and air all adapted to deliver to the engine intake and means whereby the mixture from one of such means is ignited to heat the mixture delivered by one of the other means.

32. The combination with a combustion engine intake, of a carbureter and auxiliary means for conducting fuel to the intake adapted to conduct such fuel thereto initially at a high rate and later at a substantially constant rate, and a liquid fuel combustion device adapted to heat said auxiliary fuel.

33. The combination in an automotive combustion engine, of a carburetor, an auxiliary fuel supply device, a combustion device associated in heating relation to the latter, and means at the operator's station for putting both said devices in operation.

34. The combination in an engine, of a main carburetor, an auxiliary carburetor adapted for normally delivering a mixture of liquid fuel and air in constant proportions, means independent of both carburetors for heating and vaporizing such fuel, and means for conducting the vaporous mixture to the engine.

35. The combination of a main carburetor, an auxiliary carburetor adapted for operation coincidently therewith, a valve controlling such operation at the operator's station for opening and closing said valve independently of the control of said main carburetor.

36. In combination an automotive engine having a main carburetor and its throttle, an auxiliary carburetor, a heating device associated with the latter and means at the operator's station independent of said throttle for starting and stopping the operation of said auxiliary carburetor.

37. The combination with the mixture supply apparatus of an engine, of means for transmitting heat to the mixture, a control device for causing such means to function and means whereby the operation of said device increases the rate at which mixture is supplied to the combustion space of the engine.

38. The combination with the mixture supply apparatus of an engine, of means for heating the mixture, an operating device for causing said heating means to function, a control element adapted to establish the normal minimum or idling speed of the engine, and means whereby the use of said device increases said minimum.

In testimony whereof, I have signed this specification.

JOHN GOOD.

CERTIFICATE OF CORRECTION.

Patent No. 1,761,388.                                     Granted June 3, 1930, to

JOHN GOOD.

It is hereby certified that error appears in the printed specification of the above numbered patent requiring correction as follows: Page 5, line 51, claim 1, after the word "throttle" insert the word "to"; same page, line 111, claim 7, strike out the words "therefrom to the engine intake, and control-" and insert the same to follow after the word "medium" line 109, same claim; and that the said Letters Patent should be read with these corrections therein that the same may conform to the record of the case in the Patent Office.

Signed and sealed this 24th day of June, A. D. 1930.

(Seal)

M. J. Moore,
Acting Commissioner of Patents.